US011418550B1

(12) United States Patent
Eberlein et al.

(10) Patent No.: US 11,418,550 B1
(45) Date of Patent: Aug. 16, 2022

(54) SERVICE-MESH SESSION PRIORITIZATION

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/372,682

(22) Filed: Jul. 12, 2021

(51) Int. Cl.
| | |
|---|---|
| *H04L 65/1083* | (2022.01) |
| *H04L 65/10* | (2022.01) |
| *H04L 65/1096* | (2022.01) |
| *H04L 67/133* | (2022.01) |

(52) U.S. Cl.
CPC ...... *H04L 65/1086* (2013.01); *H04L 65/1013* (2013.01); *H04L 65/1096* (2013.01); *H04L 67/40* (2013.01)

(58) Field of Classification Search
CPC ............. H04L 65/1086; H04L 65/1013; H04L 65/1096
USPC .......................................................... 709/224
See application file for complete search history.

(56) References Cited

U.S. PATENT DOCUMENTS

| | | | | |
|---|---|---|---|---|
| 8,625,757 | B1* | 1/2014 | Karpov | H04M 15/47 379/112.06 |
| 8,804,944 | B1* | 8/2014 | Hopkins | H04M 3/5166 379/265.09 |
| 9,237,132 | B2* | 1/2016 | Mihelich | H04L 63/029 |
| 9,237,220 | B2* | 1/2016 | Waris | H04W 4/21 |
| 9,519,920 | B1* | 12/2016 | Chitilian | G06Q 30/0263 |
| 9,813,509 | B1* | 11/2017 | Visser | H04L 67/16 |
| 10,120,734 | B1* | 11/2018 | Doraiswamy | G06F 21/44 |
| 10,764,375 | B2* | 9/2020 | Jayaraman | H04L 67/141 |
| 11,308,502 | B2* | 4/2022 | Metwalley | H04L 67/22 |
| 2008/0201154 | A1* | 8/2008 | Haynes Williamson | G06Q 90/00 705/1.1 |
| 2011/0249682 | A1* | 10/2011 | Kean | H04L 45/00 370/401 |
| 2012/0023265 | A1* | 1/2012 | Liao | G06F 13/387 710/5 |

(Continued)

OTHER PUBLICATIONS

Docs.microsoft.com [online], "Circuit Breaker pattern" Jun. 2017, [retrieved on Jun. 8, 2021], retrieved from: URL <https://docs.microsoft.com/en-us/azure/architecture/patterns/circuit-breaker#:~:text=The%20Circuit%20Breaker%20pattern%20prevents%20an%20application%20from,to%20invoke%20an%20operation%20through%20a%20circuit%20breaker>, 14 pages.

(Continued)

*Primary Examiner* — Tauqir Hussain
(74) *Attorney, Agent, or Firm* — Fish & Richardson P.C.

(57) ABSTRACT

Methods, systems, and computer-readable storage media for determining a sub-set of services, each service in the sub-set of services being in an overload status and having a SSF associated therewith, providing statistics associated with each service in the sub-set of services and relating service call statistics to each API group of a set of API groups, determining a set of sessions based on the service call statistics, each session in the set of sessions associated with at least one service in the sub-set of services having a service call statistic that exceeds a threshold service call statistic, defining an execution group and a waiting group, determining that a session is in the waiting group, and in response, blocking a request of the session from being processed by a service in the sub-set of services, and providing a wait indication to a user associated with the session.

20 Claims, 7 Drawing Sheets

(56) References Cited

U.S. PATENT DOCUMENTS

| | | | |
|---|---|---|---|
| 2014/0229462 A1* | 8/2014 | Lo | G06F 16/951 |
| | | | 707/707 |
| 2015/0281645 A1* | 10/2015 | Pai | H04N 7/147 |
| | | | 348/14.1 |
| 2016/0323187 A1* | 11/2016 | Guzman | H04L 47/125 |
| 2016/0323188 A1* | 11/2016 | Guzman | H04L 67/101 |
| 2016/0323197 A1* | 11/2016 | Guzman | G06F 9/46 |
| 2017/0005915 A1* | 1/2017 | Mirsky | H04L 45/28 |
| 2017/0034224 A1* | 2/2017 | Baram | H04L 65/1069 |
| 2017/0083312 A1* | 3/2017 | Pindado | H04W 4/50 |
| 2017/0195458 A1* | 7/2017 | Parekh | G06F 9/547 |
| 2018/0103364 A1* | 4/2018 | Gholmieh | H04W 8/005 |
| 2018/0109624 A1* | 4/2018 | Jayaraman | H04L 67/141 |
| 2018/0357291 A1* | 12/2018 | Choi | G06F 16/254 |
| 2019/0102226 A1* | 4/2019 | Caldato | G06F 9/455 |
| 2019/0146854 A1* | 5/2019 | Jones | G06F 9/54 |
| | | | 719/328 |
| 2019/0370146 A1* | 12/2019 | Babu | G06F 11/3089 |
| 2020/0125404 A1* | 4/2020 | Klein | G06F 9/54 |
| 2020/0195526 A1 | 6/2020 | Eberlein et al. | |
| 2020/0214072 A1* | 7/2020 | Wang | H04W 48/16 |
| 2020/0252376 A1* | 8/2020 | Feng | H04L 45/74 |
| 2020/0344233 A1* | 10/2020 | Lai | H04W 4/70 |
| 2021/0336936 A1* | 10/2021 | Feng | H04L 67/146 |

OTHER PUBLICATIONS

Wikipedia.org [online], "Circuit Breaker Design Pattern" Jul. 2010, [retrieved from Jun. 8, 2021], retrieved from: URL <https://en.wikipedia.org/wiki/Circuit_breaker_design_pattern>, 3 pages.

* cited by examiner

| Last request / Progress | <1 minute | <2 minutes | <3 minutes | <4 minutes | <5 minutes |
|---|---|---|---|---|---|
| 0% | 10 | 14 | 17 | 19 | 20 |
| 25% | 6 | 9 | 13 | 16 | 18 |
| 50% | 3 | 5 | 8 | 12 | 15 |
| 75% | 1 | 2 | 4 | 7 | 11 |

SERVICE-MESH SESSION PRIORITIZATION

BACKGROUND

Enterprise applications may be architected as distributed applications that leverage a mesh of software services called a service mesh. In such applications, each service is an independent software component that includes code and data used to execute complete and discrete functionality (e.g., record error logs). Services use common interface standards and can be communicated with over a network (e.g., Internet) using standard communication protocols. The services in a service mesh may be deployed on premise and/or in the cloud. Interactions with services are conducted during so-called sessions, during which loads are applied to services within a service mesh. A load can generally be described as a number of requests made to a service from users and/or other services. In some instances, a service can come into an overload situation, in which the service is unable to handle the number of requests received.

To address increased load, a service is typically scaled-up or -out. For example, a number of instances of a service can be increased, each instance handling a portion of the load. However, services can have intrinsic scaling limitations, which can result from a need for synchronized actions within the service, bottlenecks in persistency, and the like. When scaling of a service hits a limit, the service, and thus also the full application, runs into an overload situation. In view of this, approaches have been developed to address overload situations. Typical approaches can be described as arbitrary "throttling of service requests" or "circuit breaker" techniques, which can have a significant adverse impact on performance. For example, when requests are throttled, responses to requests are significantly slowed, which often results in the requests being abandoned (e.g., a time-out scenario) and/or requests being resubmitted, which exacerbates the overload situation. As another example, a circuit breaker temporarily interrupts all communication with the service, such that no requests are processed. Once the circuit breaker is removed, the requests are resubmitted and, again, the service goes into an overload situation.

SUMMARY

Implementations of the present disclosure are directed to a session prioritization system that ensures stable processing of services during an overload situation. More particularly, implementations of the present disclosure are directed to a session prioritization system that identifies services in an overload situation and prioritizes sessions to mitigate and efficiently resolve the overload situation.

In some implementations, actions include determining a sub-set of services from the set of services, each service in the sub-set of services being in an overload status and having a stable service factor (SSF) associated therewith, providing a set of service call statistics including statistics associated with each service in the sub-set of services and relating service call statistics to each application programming interface (API) group of a set of API groups, determining a set of sessions based on the service call statistics, each session in the set of sessions being associated with at least one service in the sub-set of services having a service call statistic that exceeds a threshold service call statistic, defining a first sub-set of sessions of the set of sessions as an execution group and a second sub-set of sessions of the set of sessions as a waiting group, receiving a first request from a first session, and determining that the first session is in the waiting group, and in response, blocking the first request from being processed by a respective service in the sub-set of services, and providing a wait indication to a user associated with the first session. Other implementations of this aspect include corresponding systems, apparatus, and computer programs, configured to perform the actions of the methods, encoded on computer storage devices.

These and other implementations can each optionally include one or more of the following features: a defining a first sub-set of sessions of the set of sessions as an execution group and a second sub-set of sessions of the set of sessions as a waiting group includes, for each session in the set of sessions, determining a priority value based on a progress parameter and a time since last activity parameter, and providing a cutoff parameter between priority values, the cutoff parameter separating sessions into the first sub-set of sessions and the second sub-set of sessions; actions further include, in response to determining that the first session is in the waiting group, advancing a time since last request timestamp associated with the first session; an initial SSF is set for each service in the sub-set of services; actions further include changing a SSF of a service in the sub-set of services, and selectively removing the service from the sub-set of services based on the SSF after being changed; each service call statistic indicates a probability that a service will be called for a respective API group; and actions further include receiving a second request from a second session, and determining that the second session is in the execution group, and in response, allowing the second request to be processed by a respective service in the sub-set of services.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to a session prioritization system that ensures stable processing of services during an overload situation. More particularly, implementations of the present disclosure are directed to a session prioritization system that identifies services in an overload situation and prioritizes sessions to mitigate and efficiently resolve the overload situation.

In some implementations, actions include determining a sub-set of services from the set of services, each service in the sub-set of services being in an overload status and having a stable service factor (SSF) associated therewith, providing a set of service call statistics including statistics associated with each service in the sub-set of services and relating service call statistics to each application programming interface (API) group of a set of API groups, determining a set of sessions based on the service call statistics, each session in the set of sessions being associated with at least one service in the sub-set of services having a service call statistic that exceeds a threshold service call statistic, defining a first sub-set of sessions of the set of sessions as an execution group and a second sub-set of sessions of the set of sessions as a waiting group, receiving a request from a session, and determining that the session is in the waiting group, and in response, blocking the request from being processed by a respective service in the sub-set of services, and providing a wait indication to a user associated with the session.

To provide further context for implementations of the present disclosure, enterprise applications may be architected as distributed applications that leverage a mesh of software services called a service mesh. In such applications, each service is an independent software component that includes code and data used to execute complete and discrete functionality (e.g., record error logs). Services use common interface standards and can be communicated with over a network (e.g., Internet) using standard communication protocols. The services in a service mesh may be deployed on premise and/or in the cloud. Interactions with services are conducted during so-called sessions, during which loads are applied to services within a service mesh. A load can generally be described as a number of requests made to a service from users and/or other services. In some instances, a service can come into an overload situation, in which the service is unable to handle the number of requests received.

To address increased load, a service is typically scaled-up or -out. For example, a number of instances of a service can be increased, each instance handling a portion of the load. However, services can have intrinsic scaling limitations, which can result from a need for synchronized actions within the service, bottlenecks in persistency, and the like. When scaling of a service hits a limit, the service, and thus also the full application that the service is a part of, runs into an overload situation. In view of this, approaches have been developed to address overload situations.

Typical approaches to handling overload situations can be described as arbitrary "throttling of service requests" or "circuit breaker" techniques, which can have a significant adverse impact on performance. For example, when requests are throttled, responses to requests are significantly slowed. This often results in the requests being abandoned (e.g., a time-out scenario) and/or requests being resubmitted, which exacerbates the overload situation. As another example, a circuit breaker temporarily interrupts all communication with the service, such that no requests are processed. Once the circuit breaker is removed, the requests are resubmitted and, again, the service goes into an overload situation. This presents erratic on/off behavior of the service and thus also the full application that the service is a part of.

In view of the above context, implementations of the present disclosure provide a session prioritization system to ensure stable processing of services during an overload situation. As described in further detail herein, the session prioritization system of the present disclosure identifies services in an overload situation and sorts sessions into an execution group and a waiting group. In some examples, sorting is performed based on historic data and real-time data. The historic data is used to compute a model representative of service call probability, which can be used to identify sessions that are less critical with respect to the impact they create on the overload situation and sorting such sessions into the execution group. Real-time data representative of current sessions is evaluated based on information regarding the progress (stage) of completion of the user activity and information on the user's latest interactions. By this, sessions closer to completion can be sorted into the execution group and other sessions into a waiting group, for example. In this manner, sessions in the execution group can be served reliably, so they do not fail close to the finish line and have to start over (causing additional load), and sessions in the waiting group can be informed about their wait time relative to their progress. This increases the overall throughput, because only sessions in the execution group create load whereas sessions in the waiting group are blocked before even hitting the overloaded service(s). Further, sessions in the execution group have already demonstrated their ability to make progress, so it can be assumed that they will finish their current process in a time-efficient manner, making room for other sessions to succeed.

Accordingly, and as described in further detail herein, the session prioritization system of the present disclosure provides for advanced prioritizing of sessions based on a combination of their potential impact an ongoing overload situation and their current stage of completion. Among other distinctions, the session prioritization of the present disclosure is a fundamentally different approach to traditional approaches in overload handling, which do not provide for assessment of calls during sessions regarding other relevant criteria. For example, circuit breakers temporarily interrupt complete communication channels to allow overloaded services to recover. Once the circuit breaker is removed, the overload piles up again and, as a result, all sessions experience an erratic on/off behavior of the overall system. With session prioritization of the present disclosure, a consistent experience is achieved by prioritized processing of related requests as maximum load allows in a smarter way than traditional approaches, a continuous reduction in the backlog is enabled and overload situations can be reliably resolved.

Figure 1:
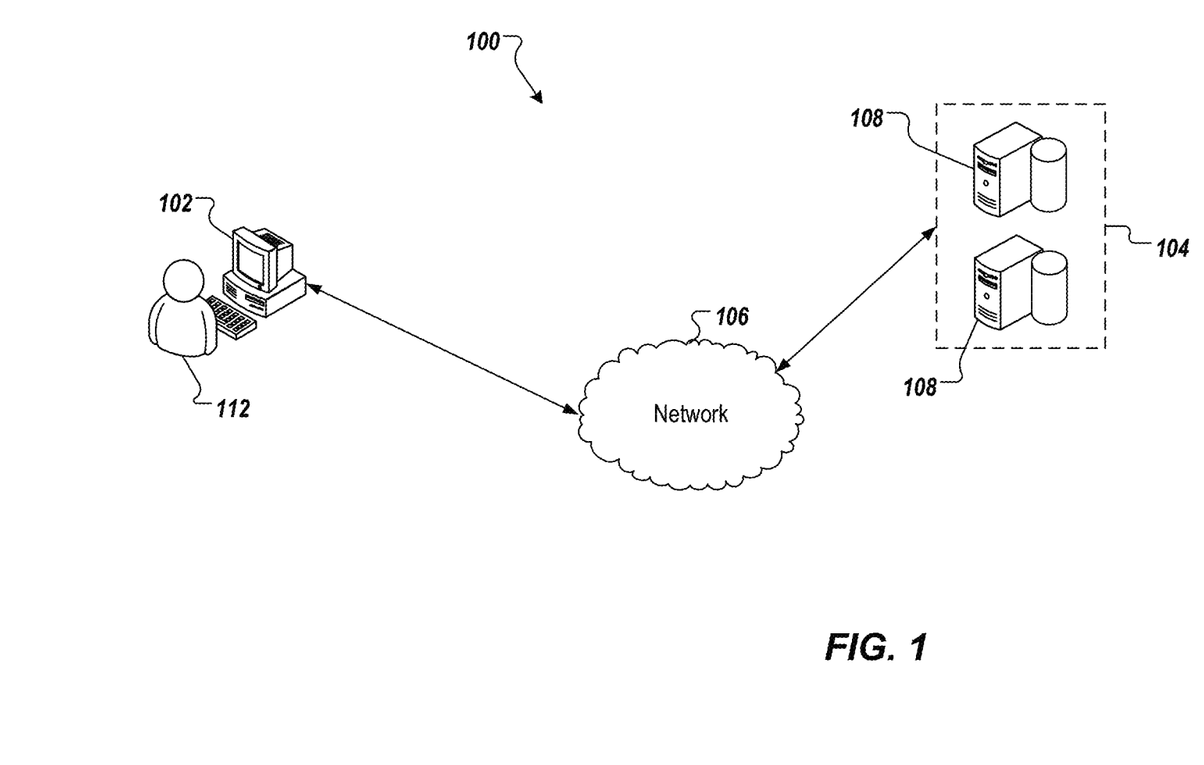
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., public switched telephone network (PSTN)) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some examples, the server system 104 can host one or more service-based applications. For example, the user 112 can interact with an application during a respective session. Although a single user is depicted in FIG. 1, it is contemplated that multiple users (e.g., tens, hundreds, thousands) can concurrently interact with the application in respective sessions. Consequently, each session puts a load on the application and the underlying services, which can result in an overload situation, as described herein.

In accordance with implementations of the present disclosure, and as noted above, the server system 104 can host a session prioritization system to mitigate and resolve overload situations of applications. As described in further detail herein, the session prioritization system prioritizes sessions that are determined to likely affect the overloaded service(s), while other sessions are processed as normal. Further, the session prioritization system prioritizes active sessions that have already made some progress in completing their currently running process over sessions that are less active or have made less progress. This enables active and progressing sessions to be finished without disturbance and make room for other sessions to succeed. The session prioritization system also selectively blocks sessions early in the processing, causing no load on already overloaded services. Users in such sessions are informed about their position in a waiting queue.

Figure 2:
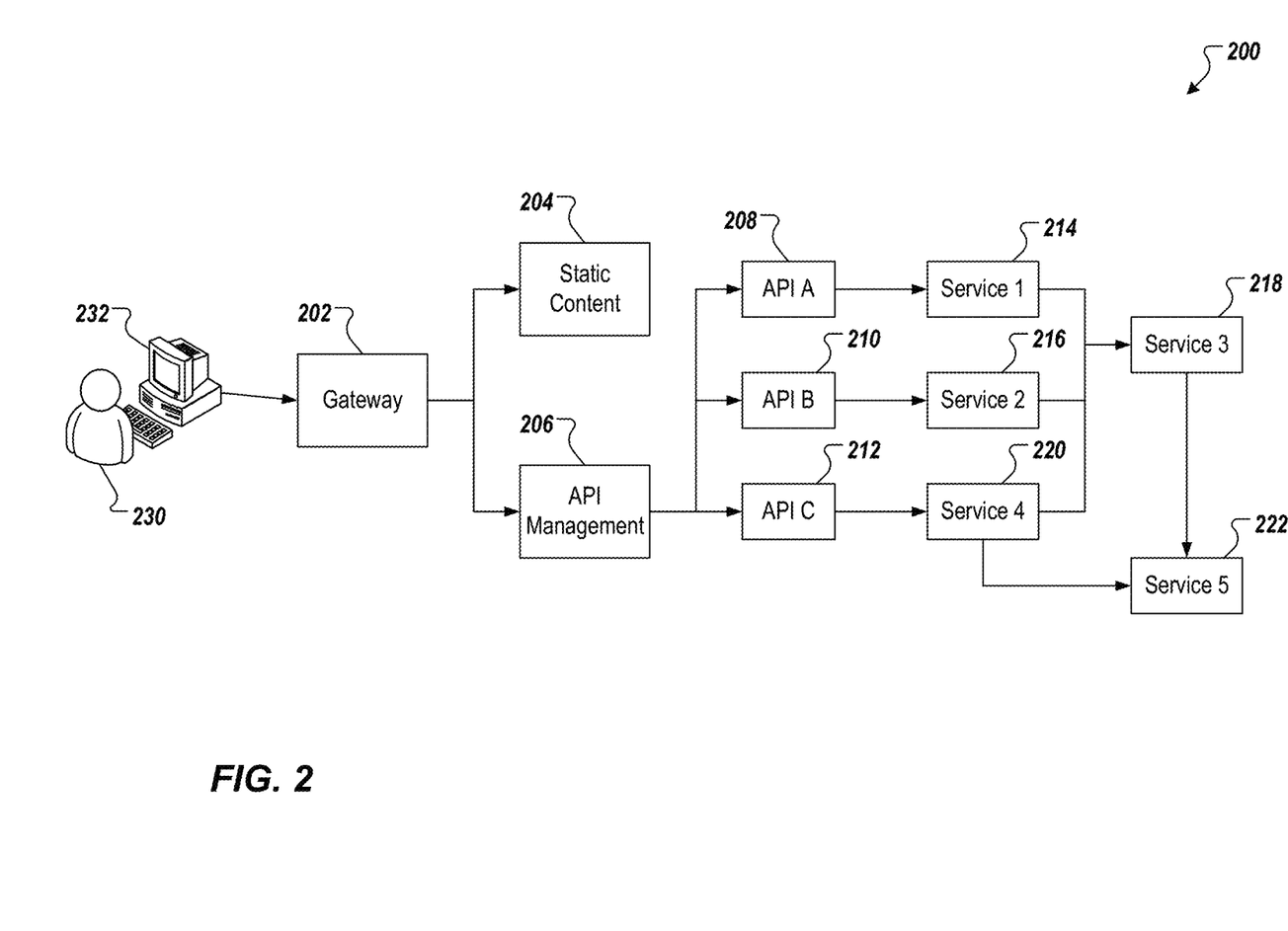
FIG. 2 depicts a conceptual representation of an example services-oriented architecture (SOA) to illustrate implementations of the present disclosure.

FIG. 2 depicts a conceptual representation of an example SOA 200 for a service-based web application to illustrate implementations of the present disclosure. For example, a user 230 interacts with the web-based application through a computing device 232. Non-limiting reference is made to FIG. 2 to illustrate implementations of the present disclosure. It is contemplated that implementations of the present disclosure can be realized for session prioritization of any appropriate service-based application.

In the example of FIG. 2, the SOA 200 includes a gateway 202, static content 204, an API management module 206, a first API 208, a second API 210, a third API 212, a first service 214, a second service 216, a third service 218, a fourth service 220, and a fifth service 222. Each of the first service 214, the second service 216, the third service 218, the fourth service 220, and the fifth service 222 can be provided as a computer-executable program that provides functionality and/or data that contributes to at least one process provided by the service-based web application. More generally, each service is an independent software component that includes code and data used to execute complete and discrete functionality (e.g., record error logs). In some examples, the static content 204 can include content that is provided through the web application, which remains the same for all sessions (e.g., text and/or images displayed to users). However, dynamic content can be provided from one or more of the services 214, 216, 218, 220, 222 through the gateway 202 and the API management module 206. In some examples, dynamic content can be different between different sessions (e.g., can be generated by a service in response to input received from a respective user).

In further detail, as the user 230 interacts with the web application one or more API calls can be made to one or more of the services 214, 216, 220 through the APIs 208, 210, 212, respectively. The API management module 206 facilitates the API calls. In some examples, the API management module 206 monitors and records statistics representative of the API calls. In some examples, respective runtimes of the services 214, 216, 218, 220, 222 monitor and record statistics representative of the API calls. In the example of FIG. 2, the third service 218 can be called by each of the first service 214, the second service 216, and the fourth service 220, and the fifth service 222 can be called by the third service 218 and the fourth service 220. As discussed in further detail herein, services that can be called by multiple services (e.g., the third service 218, the fifth service 222) can become bottlenecks.

In some implementations, the session prioritization system of the present disclosure learns a model that is representative of application architecture (in terms of API calls and connected services) and user behavior. In some examples, the model is provided as a table of API groups and service call statistics for respective services of each API group. For example, the session prioritization system monitors API management to learn an API group probability map (e.g., provided as a table, as described in further detail herein), which records information about which services (e.g., S1, S2 . . . ) will be called with a certain probability, if a set of APIs (e.g., A, B, C . . . ) are called. This reflects both application architecture and typical user behavior. As described in further detail herein, sessions that have called APIs above a threshold probability to consume the overloaded service(s) are considered in prioritization of sessions. Other sessions that have a relatively low probability (e.g., a probability less than the threshold probability) to cause additional load on already overloaded service(s) are processed as usual without any restrictions.

In some implementations, the session prioritization system monitors the service mesh (i.e., the interconnected services) for overload situations of any service(s). A service can be determined to be in an overload situation based on calls to the respective services. For example, and without limitation, a service can be determined to be in an overload situation when the percentage of calls being declined by the service (resulting in errors or timeouts) compared to all calls is above a pre-defined threshold (e.g., 13% calls declined >10% threshold). In some examples, a service that is in an overload situation can be included in a set of critical services. In some implementations, the sessions are ranked based on "completion progress" and "time since last interaction with the application." Lower ranked sessions are put on hold until higher ranked sessions have been completed. If users have a session that is on hold, the users are informed about the gap between processing rank and their rank, so the users have transparency into how soon they are to be served. In some implementations, existence of the overload situation (s) and session ranking are re-evaluated recurringly to adjust to changes in service throughput (e.g., changed resources), active sessions (e.g., completed or new sessions) and percentage of failed service calls.

Accordingly, the session prioritization system of the present disclosure addresses multiple technical issues. In one example, because the session prioritization system limits the number of sessions that are able to call an overloaded service, the service will receive less calls and will be able to successfully process these calls. This obviates the need to reject calls and enables the service to handle the remaining calls more efficiently and without causing any disruption. In this manner, early ending of sessions can be avoided, which would otherwise result in the waste of technical resources expended for each of the sessions. Further, this mitigates re-expenditure of technical resources, if users start new sessions in response to early ending of previous sessions (e.g., a user quits a session, then re-establishes a session in another attempt).

The session prioritization system of the present disclosure also provides other advantages. For example, ranking of sessions can be adjusted to the application needs to reflect sessions according to expected value based on the stage of completion. In some examples, the session prioritization system can give sessions with higher value, a higher progress to optimize throttling for value and have high value interactions handled with priority. As another example, because the session prioritization system determines a rank of a session and can compute a difference between rank currently being processed and the rank of the session rank, information can be computed to provide an indication as to when a session will be processed. Based on historic data, this gap can be translated into time, which can be provided to the user and indicate when the session will be processed.

In some examples, prioritizing sessions and executing sessions based on priority are performed at a stage when any traditional approaches (e.g., scale up/scale out measures based on constant load monitoring in combination with moving service instances to more powerful machines/starting additional service instances) have been taken and no further scaling is possible or is reasonable. That is, and in some examples, one or more traditional approaches can be performed to address overload, before the session prioritization system of the present disclosure prioritizes sessions for execution, as described in further detail herein.

Figure 3:
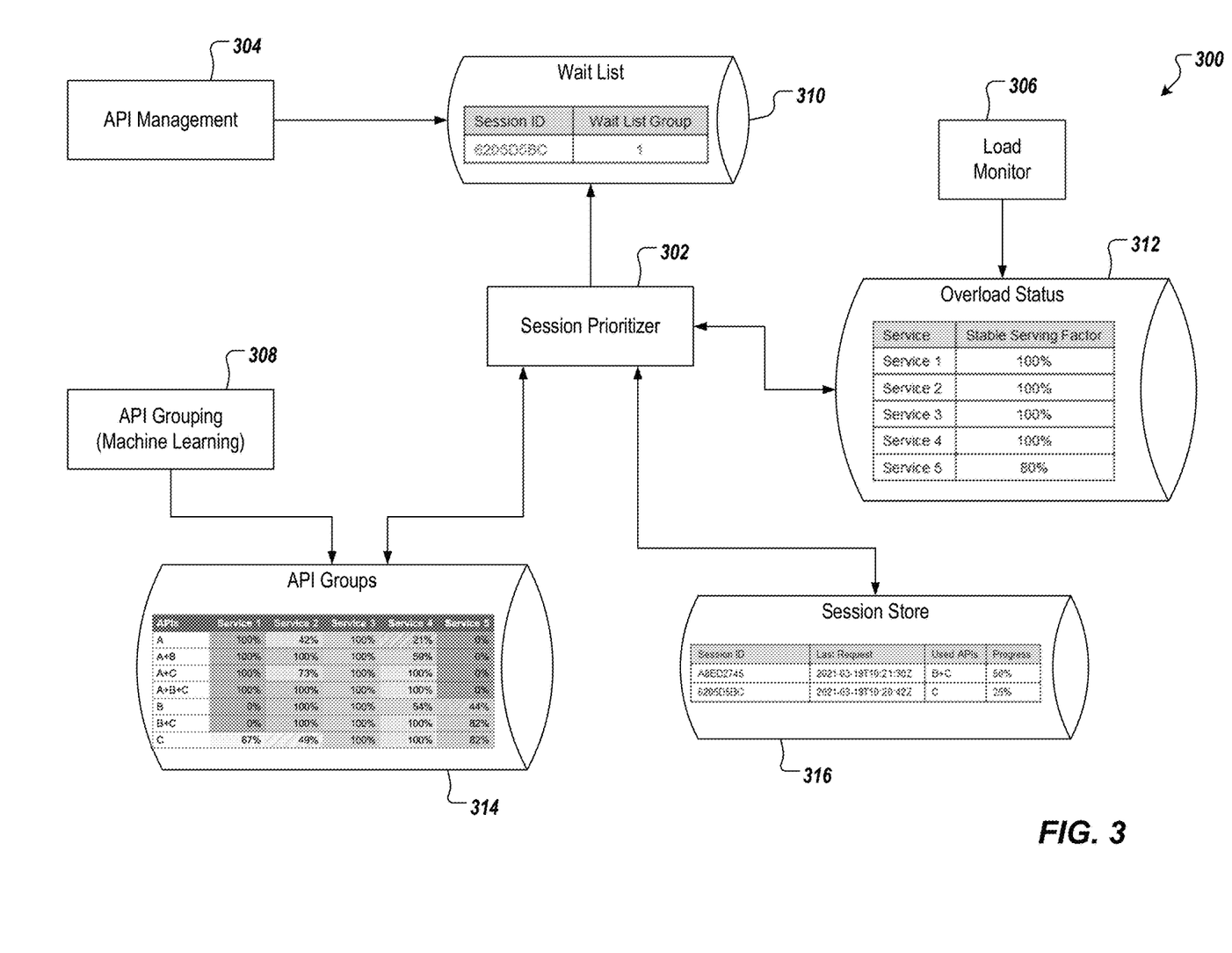
FIG. 3 depicts a conceptual representation of an example session prioritization system in accordance with implementations of the present disclosure.

FIG. 3 depicts a conceptual representation of an example session prioritization system 300 in accordance with implementations of the present disclosure. In the example of FIG. 3, the session prioritization system 300 includes a session prioritizer 302, an API management module 304, a load monitor 306, and an API grouping calculator 308. The session prioritization system 300 also includes a wait list store 310, an overload status store 312, and API groups store 314, and a session store 316.

In general, interactions of a user (e.g., the user 230 of FIG. 2) with a web application is facilitated through a session, each session being specific to a respective user. Each session is uniquely identified by a session identifier (session ID). Although not depicted in the example of FIG. 3, each service (e.g., the services 214, 216, 218, 220, 222 of FIG. 2) can write information about progress of a session to the session store 316. For example, through a process progress service (not depicted in FIG. 3) a service can write a session update that includes a session ID and progress delta information (e.g., increasing progress percentage, reducing progress percentage, defining progress completion) to the session store 316.

In accordance with implementations of the present disclosure, the session prioritizer 302 prioritizes sessions and generates a wait list that is stored in the wait list store 310. As described in further detail herein, the wait list includes a table of sessions (e.g., by session ID), each session having a priority (also referred to as wait list group) associated therewith. In some examples, the session prioritizer 302 reads the overload status data stored in the overload status store 312 to retrieve data on services that are in an overload situation. In some examples, a stable serving factor (SSF) is determined for each service and the respective SSFs are written to the overload status store 312. In this manner, each service is associated with a SSF. In some examples, for each API group (discussed in further detail herein), the session prioritizer 302 reads call probabilities for each service within the API group, each call probability indicating a likelihood that the respective service will be called. This information is provided from the API groups store 314. The session prioritizer 302 determines a session rank for sessions based on session progress and last request information, as described in further detail herein.

An application provided by a software vendor is typically composed of static content, several APIs, and services, and offers a broad set of processes and application features. Additionally, specific roles are defined for users having the same tasks to do and such roles correspond to different access permissions. Thus, individual users will typically not call all available APIs or services in one session. To address these dynamics, the session prioritization system of the present disclosure analyzes the user behavior with the specific application under consideration. In this manner, the session prioritization system can determine which APIs are typically called together in one session and, therefore, which services are used within these sessions.

Accordingly, the API grouping calculator 308 reads API information (APIs called, services called) from API monitoring (e.g., the API management module 206 of FIG. 2) to determine API groups. In some examples, an API group includes one or more APIs. In further detail, for each session, the APIs that are called within the session are monitored (e.g., by the API monitoring) and the services that are called are also monitored (e.g., services implementing monitored APIs and services called indirectly by other services). Each API group is a set of APIs called by one user within one session. For example, without limitation, example calling sequences in an example session can be considered. In a first example sequence, an API 1 (A1) is called, which results in calling each of a Service 1 (S1) and a Service 2 (S2). In a second example sequence (e.g., occurring after the first example sequence), an API 2 (A2) is called, which results in calling each of a Service 3 (S3), a Service 4 (S4), and a Service 5 (S5). In a third example sequence (e.g., occurring after the second example sequence), an API 3 (A3) is called, which results in calling of a Service 6 (S6). After execution of the example sequences, the session is closed (ends). Consequently, the example session can be determined to have multiple API groupings provided as:

A1→S1, S2
A1+A2→S1, S2, S3, S4, S5
A1+A2+A3→S1, S2, S3, S4, S5, S6

In some implementations, the API grouping calculator 308 determines API groups for each session of a set of historical sessions (e.g., sessions that have been completed). Each API group represents the set of APIs called within a respective session and the services call. The API groups are stored in the API groups store 314.

In some implementations, the API groups are used to determine service call statistics. In some examples, service call statistics are determined using a machine learning (ML) model. For example, the ML model can be trained on the API groups during a training phase to determine service call statistics during an inference phase. In some examples, the ML model receives data representative of each API group and determines service call statistics for each service implicated in the respective API service. Each service call statistic indicates a percentage of time a respective service is called when a session includes APIs of the respective API group. In a predictive sense, each service call statistic indicates a likelihood that a respective service will be called during a session. The service call statistics are recorded with the respective API groups in the API groups store 314. In some examples, the service call statistics are periodically updated (e.g., the ML model is periodically re-trained) as additional data on sessions becomes available. In this manner, older records can be removed or diminished, such that the service call statistics are representative of a current operational status (e.g., currently executing versions of the services).

Figure 4:
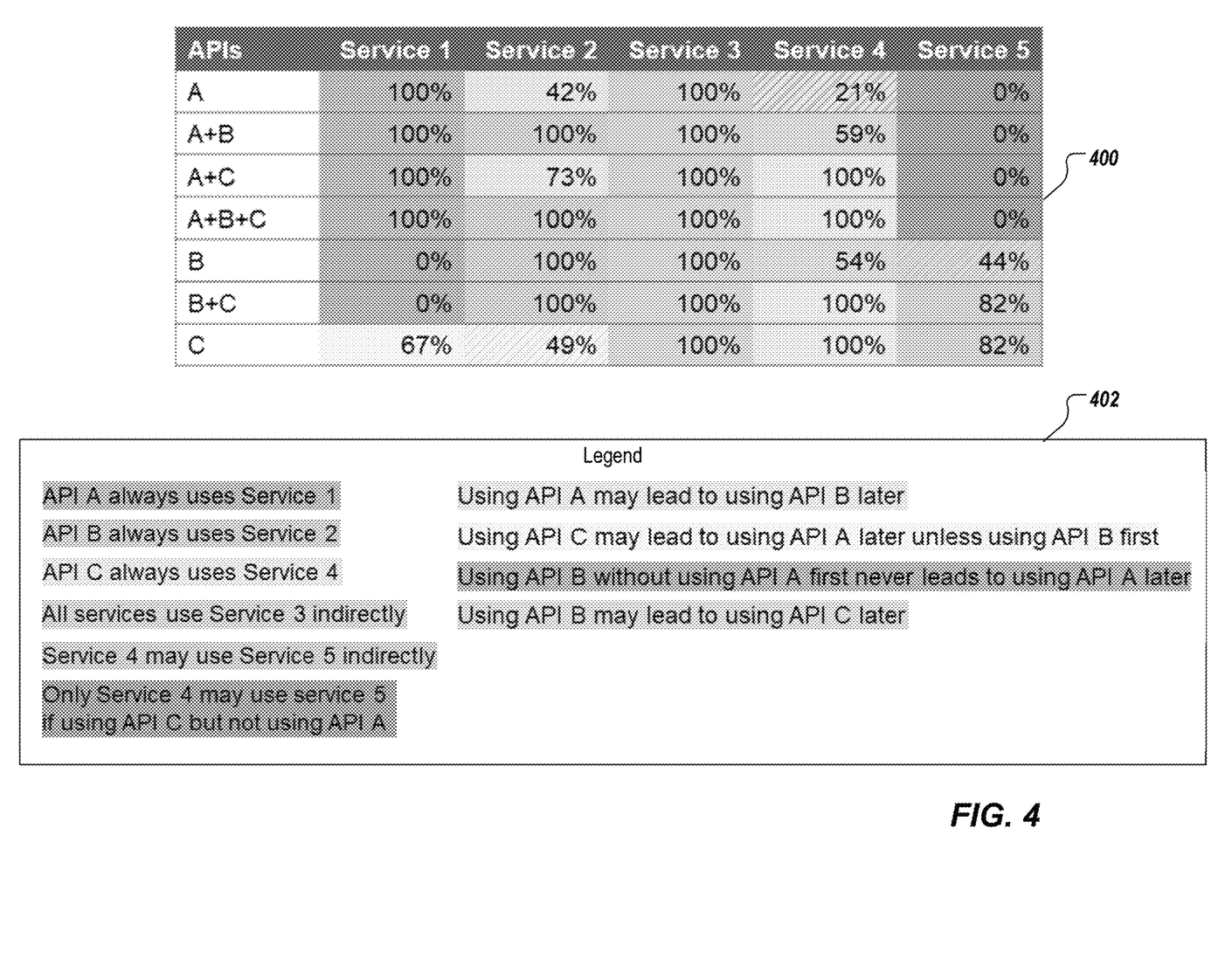
FIG. 4 depicts a table of example application programming interface (API) groups determined in accordance with implementations of the present disclosure.

FIG. 4 depicts a table 400 of example API groups and example service call statistics determined for each service of the respective groups. The table 400 is representative of an API group probability map. The example of FIG. 4 is based on the example of FIG. 2. FIG. 4 also includes a legend 402 with shaded coding to discern implications of each of the API groups and respective service statistics. For example, it can be seen that the third service 218 is always called regardless of whether the first service 214, the second service 216, or the fourth service 218 is called. As another example, it can be seen that, when calling the first API 208, there is a 42% likelihood that the second API 210, and thus the second service 216 will be called, a 21% likelihood that the third API 212 and thus the fourth service 220 will be called, and no likelihood that the fifth service 222 will be called. Accordingly, the table 400 not only reflects probabilities from direct call hierarchies, but also the probabilities that, after using certain APIs, some other APIs are more or less likely to be used later within the same session.

As introduced above, the session prioritizer 302 determines a priority for each session that is in process. In some examples, a priority is determined based on progress and time since last request. In some implementations, a last request and progress map is provided and is used to determine session priority, as described in further detail herein.

In some examples, the progress is a parameter of the session that can be increased or decreased. In some examples, a process progress service receives a session ID for a respective session and can add progress percentage, reduce progress percentage, and define absolute progress values. The progress provides an indication as to whether the session is moving forward towards completion and honors progress with priority. That is, the more progress (i.e., the closer to completion), the higher the priority.

In some examples, the time since last request is the duration since the user last interacted with the session (e.g., the time since the user last provided input for processing in the session). For example, the user entered text or values in a user interface (UI) or clicked on a UI element. Accordingly, the time since last request is representative of whether the user is actively working with the application and honors interaction with priority. That is, the more active the user is, the higher the priority.

Figure 5:
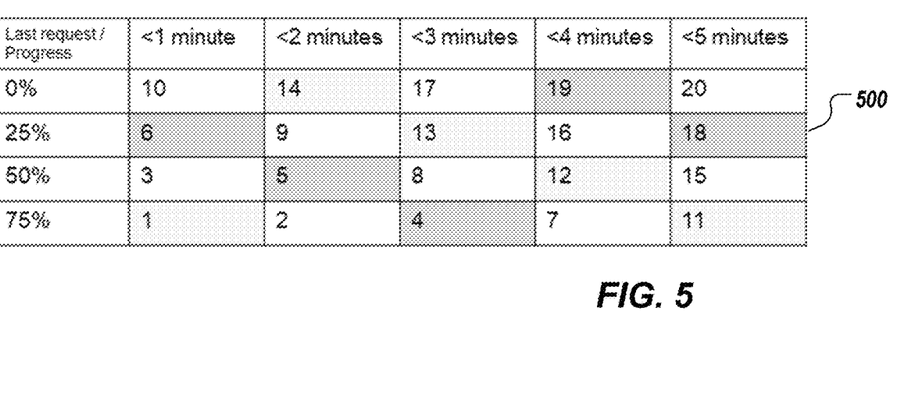
FIG. 5 depicts an example session priority matrix in accordance with implementations of the present disclosure.

FIG. 5 depicts an example session priority matrix 500 in accordance with implementations of the present disclosure. In the example of FIG. 5, a session-timeout of 5 minutes is configured (i.e., if there is no activity in 5 minutes, the session ends). Each cell of the session priority matrix 500 includes a priority value that is assigned to a session based on the progress and the time of last request of the session. As represented in the session priority matrix 500, sessions with the largest progress value range (75%-100%) and the shortest time-since-request (<1 minute) have the highest priority, next are sessions with the same progress value (75%-100%) and longer time-since-request request (1-2 minutes), then sessions with less progress (50%-75%), but also shortest time-since-request (<1 minute), and so forth. It is appreciated that the granularity of the session priority matrix 500 is a non-limiting example granularity and that other granularity can be used. For example, and without limitation, progress can be provided in intervals of 1%, 10%, 20%, 25%, or any other appropriate interval. As another example, and without limitation, time since last request can be provided in intervals of 1 s, 2 s, 5 s, 10 s, 20 s, 30 s, 1 m, 2 m, 5 m, or any other appropriate interval.

In some implementations, the session prioritization system sorts the sessions according to an expected time to completion. In some examples, sessions with a relatively short time-since-update are expected to have users that are more active and therefore able to complete quickly, and sessions with large progress values are already closer to completion and should complete soon. Such sessions are given a higher priority, because they are already close to completion or are more quickly approaching completion. Consequently, these sessions should not be delayed, or any delay minimized, in order to drive these sessions to completion and quickly make room for other sessions. Sessions that are delayed include those with relatively low progress and/or slowly acting users. In some implementations, a cutoff parameter is defined, which divides the sessions into an execution group and a waiting group. That is, the cutoff parameter determines how many sessions are to be actively served and will continue to make progress and complete their activity at some point and the user ends the session.

Figure 6:
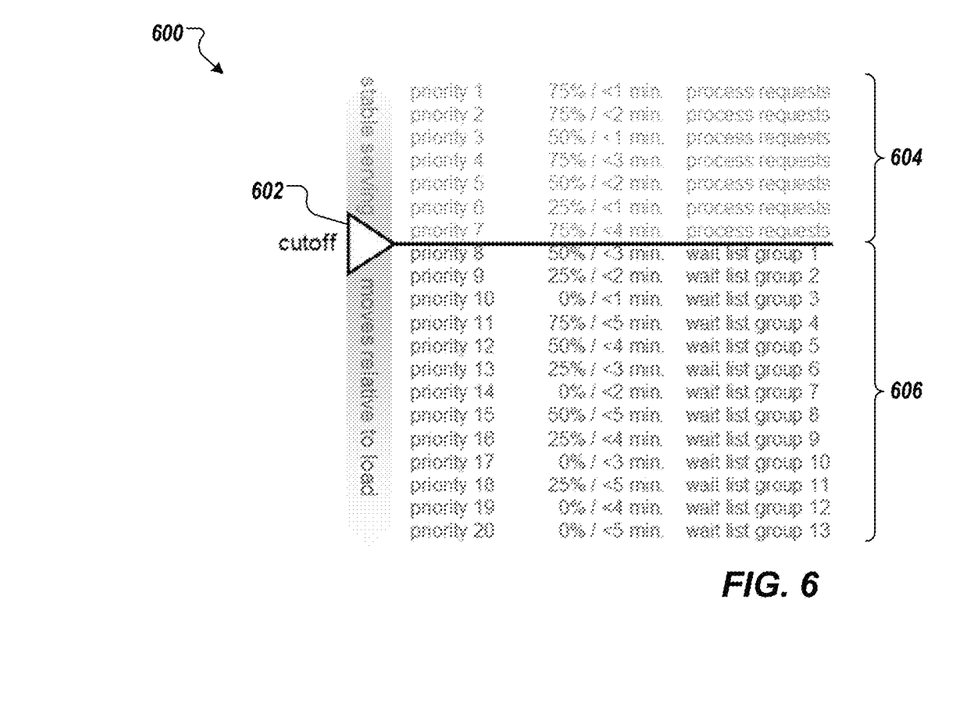
FIG. 6 depicts an example stable processing and priority listing in accordance with implementations of the present disclosure.

FIG. 6 depicts an example stable processing and priority listing 600 in accordance with implementations of the present disclosure. In the depicted example, a cutoff parameter 602 is provided between priority 7 and priority 8. The cutoff parameter 602 defines an execution group 604 and a waiting group 606. In some examples, the cutoff parameter 602 is dynamic. For example, the cutoff parameter 602 can be defined to keep a constant number of sessions within the execution group. As another example, the cutoff parameter 602 can be defined to keep a number of sessions within the execution group within a predefined range (e.g., 20-to-30 sessions).

Sessions having a priority value that places them in the execution group (e.g., a priority value of 1-7) continue to be served as normal. Sessions having a priority value that places them in the waiting group (e.g., a priority value of 8-20) are no longer served and wait until sessions of the execution group end and/or overload alleviates to be assigned a higher priority. In some examples, users in the waiting group can receive an indication as to the respective wait status. For example, a wait-list-group number can be shown to each user (e.g., You are on wait-list position <n>, You are on wait-list position <n> of <m>). In some examples, the wait-list group number can be used to compute an expected wait-time, which can be displayed to the user (e.g., Your wait time is approximately <z> minutes). Accordingly, each user in the waiting group is informed that there is a delay in processing, but also sees over time a reduction in the wait-list-group. In this manner, the users can judge whether to wait, or to terminate and restart another session later.

Figure 7:
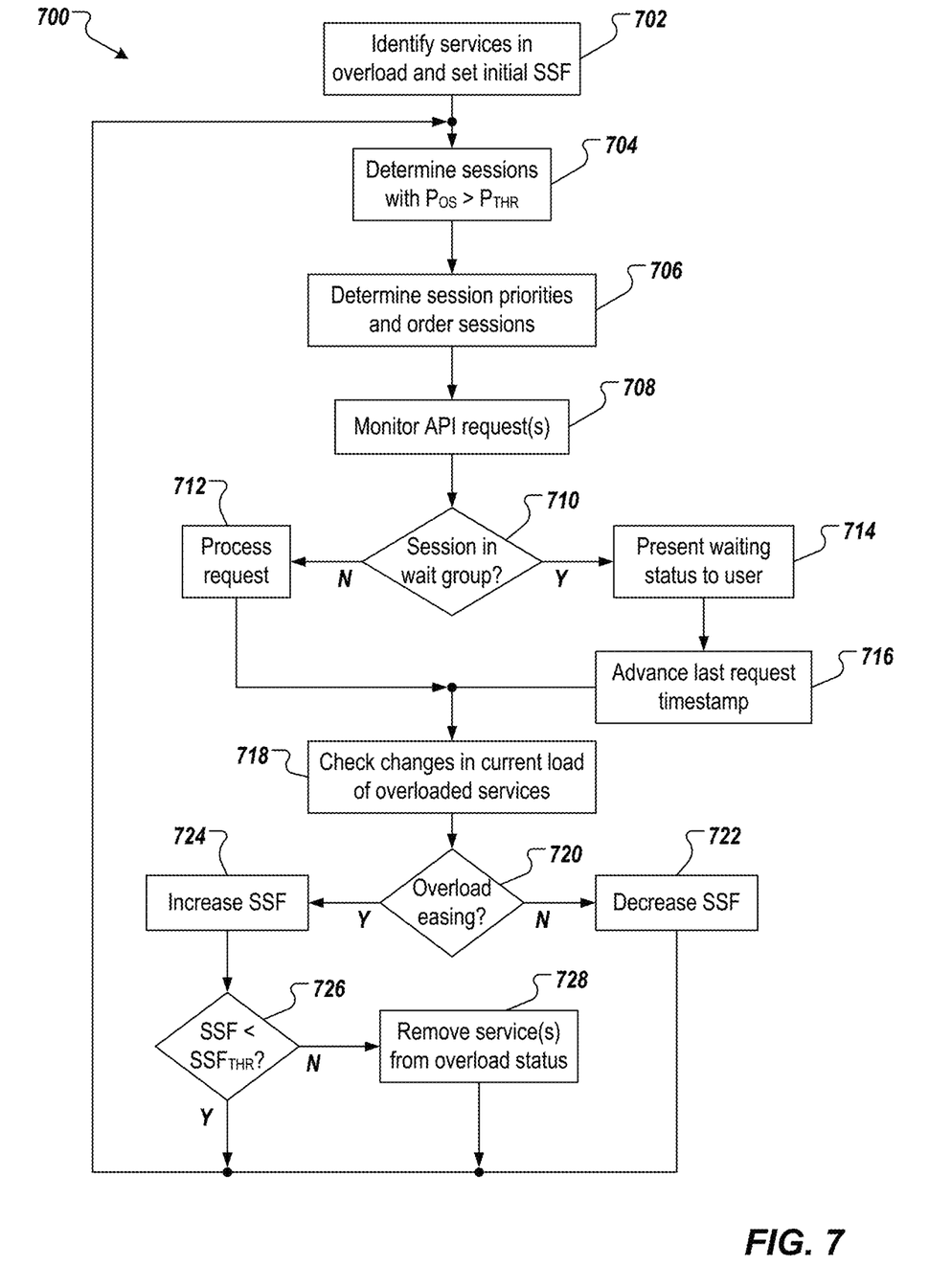
FIG. 7 depicts an example process that can be executed in accordance with implementations of the present disclosure.

FIG. 7 depicts an example process 700 that can be executed in accordance with implementations of the present disclosure. In some examples, the example process 700 is provided using one or more computer-executable programs executed by one or more computing devices.

One or more services that are in an overload scenario are identified and an initial SSF is set (702). For example, and as described in detail herein, the session prioritizer 302 of FIG. 3 determines that one or more services (e.g., a Service X) are in an overload situation. In some examples, this is based on monitoring reports that provide values of request failures and time-outs, which can be compared to a defined threshold (e.g., 10%). That is, each service having a percentage of request failure and time-outs that exceeds the defined threshold is included in a set of overload services (also referred to as critical services). For each service in the set of overload services, a SSF is set to an initial value (e.g., 80%).

For each service in the set of overload services, sessions that are likely to call the service are determined. For example, a probability ($P_{OS}$) that a session will call a service in the set of overload services is compared to a threshold probability ($P_{THR}$) (e.g., 70%). If the $P_{OS}$ meets or exceeds the $P_{THR}$, the respective session is identified as likely to call the respective service. That is, for example, the session prioritizer 302 determines the sessions having a probability of using the overloaded service(s) with a probability exceeding a (configurable) threshold. In some examples, the $P_{OS}$ is determined from an API group probability map. For example, and with reference to the example API group probability map of FIG. 4, if the second service 216 is in an overload scenario and the session under consideration corresponds to the API group A+C, the $P_{OS}$ for the session is 73%. It can be determined that the session has a high enough likelihood of calling the second service 216 (e.g., $P_{OS}$ of 73% exceeds $P_{THR}$ of 70%) that the session is to be prioritized. In short, sessions having a lower probability of calling the service (e.g., $P_{OS}<P_{THR}$) continue running unaffected, while sessions having a higher probability of calling the service (e.g., $P_{OS} \geq P_{THR}$) are prioritized and grouped into an execution group or a waiting group.

Session priorities for sessions that are to be prioritized are determined and the sessions are grouped (706). For example, and as described in detail herein, the session prioritizer 302 determines the session priority for each session (that is to be prioritized) based on a session priority matrix (e.g., the session priority matrix 500 of FIG. 5). For example, for each session, the progress and timestamp of last use are read, and the time-since-last-request is computed from the session timestamp and the current timestamp. The progress and the time-since-last-request are used to look-up a respective priority value for the session from the session priority matrix.

In some examples, the session prioritizer 302 determines the cutoff parameter that is to be used to define the execution group and the waiting group. For example, the cutoff parameter can be determined based on the total number of sessions being considered multiplied by the SSF of the service being considered. For example, if 100 sessions are determined to have a high enough likelihood of calling the service with a SSF of 80%, the cutoff parameter can be determined based on 80 sessions. For example, the cutoff parameter is selected such that the number of sessions above the cutoff parameter does not exceed 80 sessions. Accordingly, a stable processing and priority listing is provided (e.g., the stable processing and priority listing 600 of FIG. 6).

API requests are monitored (708). For example, and as described in detail herein, the session prioritizer 302 checks the incoming API requests to determine whether the sessions making the requests are in either the execution group or the waiting group. In some examples, if a session associated with an API request is not calling a service that is in overload, the session is absent from both the execution group and the waiting group. A session associated with an API request is looked-up in the stable processing and priority listing to determine whether the session is in the waiting group (710). If the session is not in the waiting group, the request of the session is processed (712). If the session is in the waiting group, the request of the session is blocked, the waiting status is presented to the user (714) and the request timestamp is advanced (716). By advancing the timestamp of the non-processed request, effectively freezes the time since the last request for the session. In this manner, waiting sessions are not getting longer time since last action values due to delay in the session being blocked from processing.

Changes in current load of overloaded services are checked (718). For example, the session prioritizer 302 recurringly checks the monitoring key performance indicators (KPIs) (e.g., request failures, time-outs) of the overloaded service(s). It is determined whether the overload for a respective service is easing (720). For example, the KPIs can indicate whether an overload is easing, or is even resolved. If the overload situation remains, the SSF is decreased (722) and the example process 700 loops back. If the overload situation is easing, the SSF for the service is increased (724). For example, the SSF can be increased by a pre-defined increment (e.g., 5%). By increasing the SSF, more sessions will be served by the service in question in the next iteration. For example, the SSF can be decreased by a pre-defined increment (e.g., 5%). By decreasing the SSF, fewer sessions will be served by the service in question in the next iteration (i.e., more sessions will be added to the waiting group). It is determined whether the SSF is less than a threshold SSF ($SSF_{THR}$) (726). For example, the session prioritizer 302 determines whether the SSF of the service in question is less than $SSF_{THR}$ (e.g., 100%). If the SSF is not less than $SSF_{THR}$ (e.g., is ≥100%), the overload situation is over for the respective service and it is removed from overload status (728). If the SSF is less than $SSF_{THR}$ (e.g., is ≥100%), the overload situation continues for the respective service and the example process 700 loops back.

Figure 8:
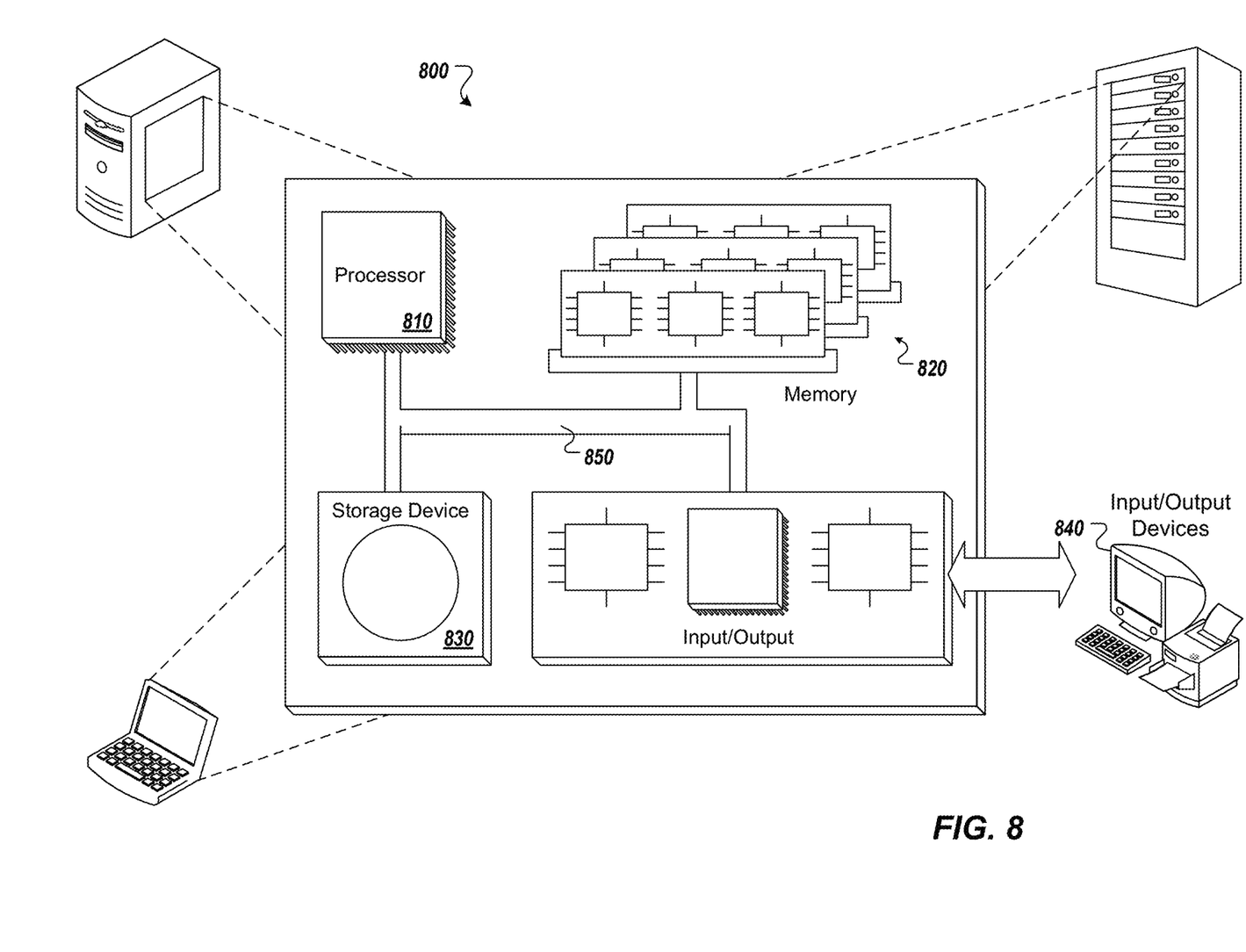
FIG. 8 is a schematic illustration of example computer systems that can be used to execute implementations of the present disclosure.

Referring now to FIG. 8, a schematic diagram of an example computing system 800 is provided. The system 800 can be used for the operations described in association with the implementations described herein. For example, the system 800 may be included in any or all of the server components discussed herein. The system 800 includes a processor 810, a memory 820, a storage device 830, and an input/output device 840. The components 810, 820, 830, 840 are interconnected using a system bus 850. The processor 810 is capable of processing instructions for execution within the system 800. In some implementations, the processor 810 is a single-threaded processor. In some implementations, the processor 810 is a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable medium. In some implementations, the memory 820 is a volatile memory unit. In some implementations, the memory 820 is a non-volatile memory unit. The storage device 830 is capable of providing mass storage for the system 800. In some implementations, the storage device 830 is a computer-readable medium. In some implementations, the storage device 830 may be a floppy disk device, a hard disk device, an optical disk device, or a tape device. The input/output device 840 provides input/output operations for the system 800. In some implementations, the input/output device 840 includes a keyboard and/or pointing device. In some implementations, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for session prioritization of sessions with services in a service-based software system comprising a set of services, the method being executed by one or more processors and comprising:
   determining a sub-set of services from the set of services, each service in the sub-set of services being in an overload status and having a stable service factor (SSF) associated therewith;
   providing a set of service call statistics comprising statistics associated with each service in the sub-set of services and relating service call statistics to each application programming interface (API) group of a set of API groups;

determining a set of sessions based on the service call statistics, each session in the set of sessions being associated with at least one service in the sub-set of services having a service call statistic that exceeds a threshold service call statistic;

defining a first sub-set of sessions of the set of sessions as an execution group and a second sub-set of sessions of the set of sessions as a waiting group;

receiving a first request from a first session; and determining that the first session is in the waiting group, and in response:

blocking the first request from being processed by a respective service in the sub-set of services, and providing a wait indication to a user associated with the first session.

2. The method of claim 1, wherein defining a first sub-set of sessions of the set of sessions as an execution group and a second sub-set of sessions of the set of sessions as a waiting group comprises:

for each session in the set of sessions, determining a priority value based on a progress parameter and a time since last activity parameter; and providing a cutoff parameter between priority values, the cutoff parameter separating sessions into the first sub-set of sessions and the second sub-set of sessions.

3. The method of claim 1, further comprising, in response to determining that the first session is in the waiting group, advancing a time since last request timestamp associated with the first session.

4. The method of claim 1, wherein an initial SSF is set for each service in the sub-set of services.

5. The method of claim 1, further comprising:

changing a SSF of a service in the sub-set of services; and selectively removing the service from the sub-set of services based on the SSF after being changed.

6. The method of claim 1, wherein each service call statistic indicates a probability that a service will be called for a respective API group.

7. The method of claim 1, further comprising:

receiving a second request from a second session; and determining that the second session is in the execution group, and in response:

allowing the second request to be processed by a respective service in the sub-set of services.

8. A non-transitory computer-readable storage medium coupled to one or more processors and having instructions stored thereon which, when executed by the one or more processors, cause the one or more processors to perform operations for session prioritization of sessions with services in a service-based software system comprising a set of services, the operations comprising:

determining a sub-set of services from the set of services, each service in the sub-set of services being in an overload status and having a stable service factor (SSF) associated therewith;

providing a set of service call statistics comprising statistics associated with each service in the sub-set of services and relating service call statistics to each application programming interface (API) group of a set of API groups;

determining a set of sessions based on the service call statistics, each session in the set of sessions being associated with at least one service in the sub-set of services having a service call statistic that exceeds a threshold service call statistic;

defining a first sub-set of sessions of the set of sessions as an execution group and a second sub-set of sessions of the set of sessions as a waiting group;

receiving a first request from a first session; and determining that the first session is in the waiting group, and in response:

blocking the first request from being processed by a respective service in the sub-set of services, and providing a wait indication to a user associated with the first session.

9. The non-transitory computer-readable storage medium of claim 8, wherein defining a first sub-set of sessions of the set of sessions as an execution group and a second sub-set of sessions of the set of sessions as a waiting group comprises:

for each session in the set of sessions, determining a priority value based on a progress parameter and a time since last activity parameter; and providing a cutoff parameter between priority values, the cutoff parameter separating sessions into the first sub-set of sessions and the second sub-set of sessions.

10. The non-transitory computer-readable storage medium of claim 8, wherein operations further comprise, in response to determining that the first session is in the waiting group, advancing a time since last request timestamp associated with the first session.

11. The non-transitory computer-readable storage medium of claim 8, wherein an initial SSF is set for each service in the sub-set of services.

12. The non-transitory computer-readable storage medium of claim 8, wherein operations further comprise:

changing a SSF of a service in the sub-set of services; and selectively removing the service from the sub-set of services based on the SSF after being changed.

13. The non-transitory computer-readable storage medium of claim 8, wherein each service call statistic indicates a probability that a service will be called for a respective API group.

14. The non-transitory computer-readable storage medium of claim 8, wherein operations further comprise:

receiving a second request from a second session; and determining that the second session is in the execution group, and in response:

allowing the second request to be processed by a respective service in the sub-set of services.

15. A system, comprising:

a computing device; and a computer-readable storage device coupled to the computing device and having instructions stored thereon which, when executed by the computing device, cause the computing device to perform operations for session prioritization of sessions with services in a service-based software system comprising a set of services, the operations comprising:

determining a sub-set of services from the set of services, each service in the sub-set of services being in an overload status and having a stable service factor (SSF) associated therewith;

providing a set of service call statistics comprising statistics associated with each service in the sub-set of services and relating service call statistics to each application programming interface (API) group of a set of API groups;

determining a set of sessions based on the service call statistics, each session in the set of sessions being associated with at least one service in the sub-set of services having a service call statistic that exceeds a threshold service call statistic;

defining a first sub-set of sessions of the set of sessions as an execution group and a second sub-set of sessions of the set of sessions as a waiting group;

receiving a first request from a first session; and determining that the first session is in the waiting group, and in response:

blocking the first request from being processed by a respective service in the sub-set of services, and providing a wait indication to a user associated with the first session.

16. The system of claim 15, wherein defining a first sub-set of sessions of the set of sessions as an execution group and a second sub-set of sessions of the set of sessions as a waiting group comprises:

for each session in the set of sessions, determining a priority value based on a progress parameter and a time since last activity parameter; and providing a cutoff parameter between priority values, the cutoff parameter separating sessions into the first sub-set of sessions and the second sub-set of sessions.

17. The system of claim 15, wherein operations further comprise, in response to determining that the first session is in the waiting group, advancing a time since last request timestamp associated with the first session.

18. The system of claim 15, wherein an initial SSF is set for each service in the sub-set of services.

19. The system of claim 15, wherein operations further comprise:

changing a SSF of a service in the sub-set of services; and selectively removing the service from the sub-set of services based on the SSF after being changed.

20. The system of claim 15, wherein each service call statistic indicates a probability that a service will be called for a respective API group.

* * * * *